Figure 1:
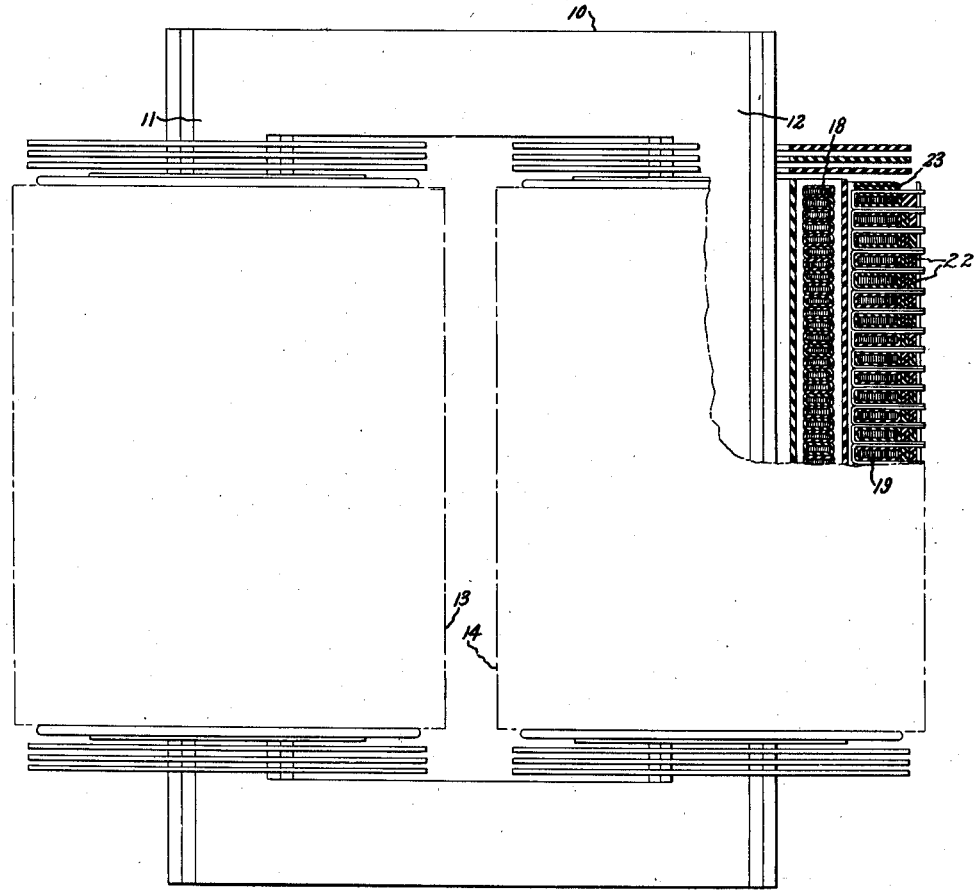

April 7, 1942.    J. M. WEED    2,279,028
ELECTRICAL INDUCTION APPARATUS
Filed July 11, 1940    3 Sheets-Sheet 1

Inventor:
James M. Weed,
by Harry E. Dunham
His Attorney.

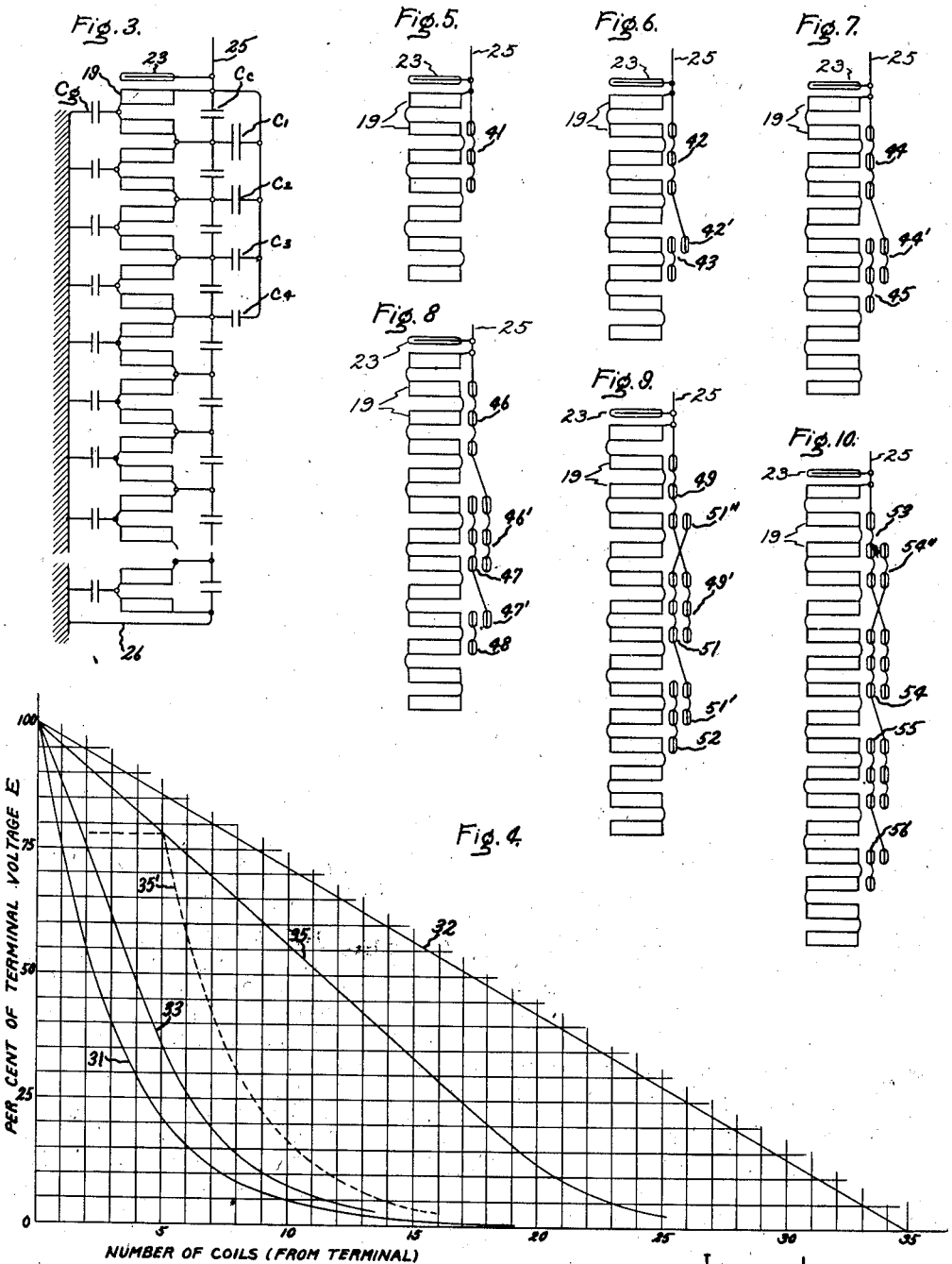

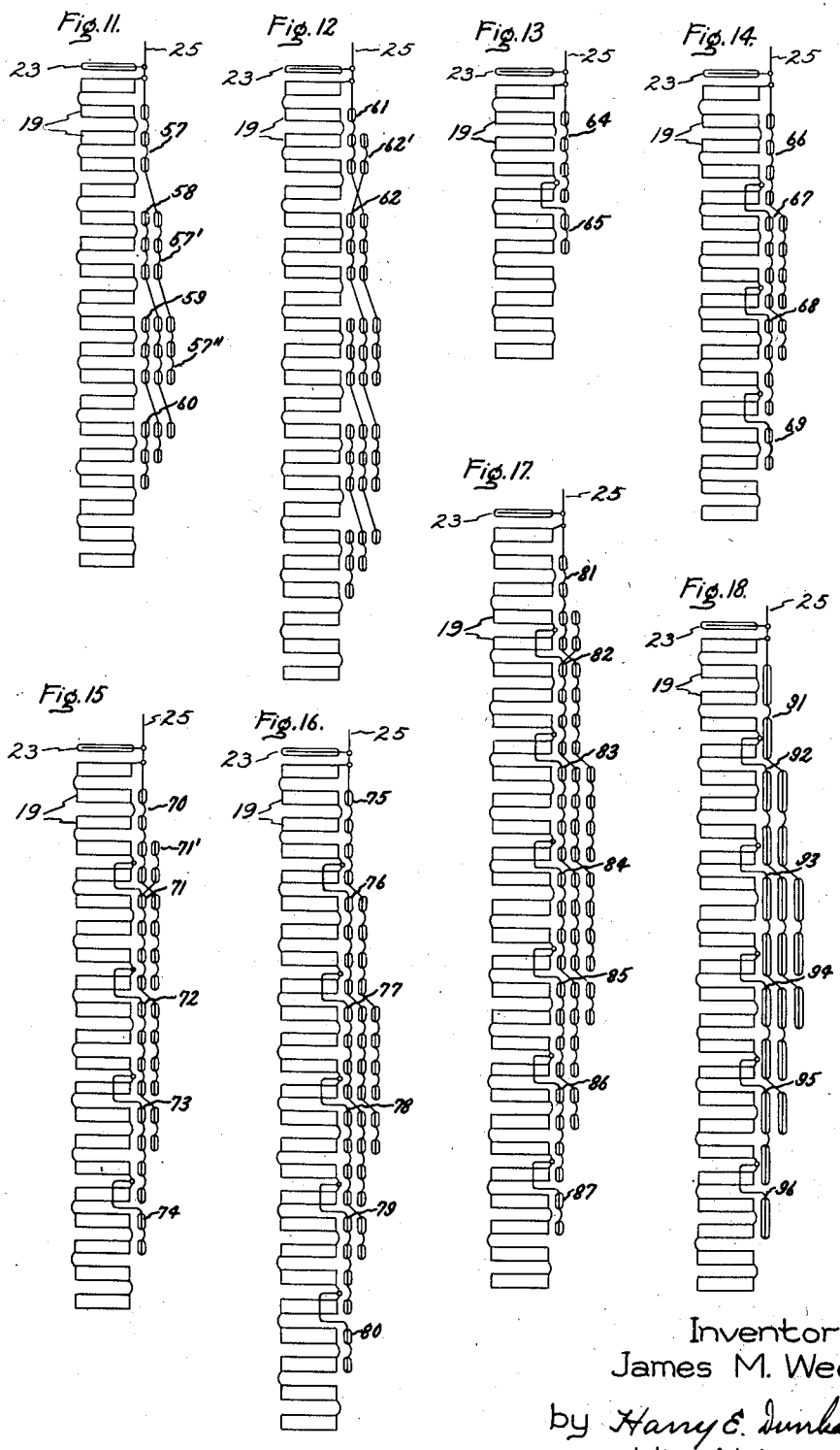

Patented Apr. 7, 1942

2,279,028

UNITED STATES PATENT OFFICE 2,279,028

ELECTRICAL INDUCTION APPARATUS

James M. Weed, Schenectady, N. Y., assignor to General Electric Company, a corporation of New York Application July 11, 1940, Serial No. 344,940

17 Claims. (Cl. 175—356)

The present invention relates to protective means for electrical induction apparatus such as transformers and reactors having windings of distributed inherent capacitance both between turns and from turns to ground. A general object of the invention is to provide the winding of the apparatus with an economical and practical electrostatic shielding structure in accordance with the general principles more fully explained in my Patent No. 1,585,448, issued May 18, 1926. More particularly it is an object of the present invention to provide improvements on the shielding arrangement disclosed in the copending application of Mr. Jack R. Meador and myself, Serial No. 137,918, filed April 20, 1937, on Electrical induction apparatus and assigned to the General Electric Company, the assignee of the instant application.

In the earlier patent, arrangements are shown for effecting initial distribution of suddenly impressed voltages with substantially uniform potential gradients throughout the entire winding by means of capacitance elements or shields, whereas, without such auxiliary capacitances or shields, the voltage concentrates over a limited winding portion near the terminal at which the voltage surge appears. It has been found satisfactory, however, to provide a modified shielding arrangement such as to obtain a substantially uniform distribution of a major part of the voltage starting from the terminal and extending over a fraction of the winding, which fraction will vary somewhat for different conditions. Only a remnant of the voltage, with reducing gradient, is left over the remaining part of the winding which part, in some instances, may be a major fraction of the total winding. Various arrangements for obtaining these results are shown in the copending and instant applications, having important advantages over those of the mentioned earlier patent in that they are adaptable to more efficient insulation, better cooling, and reduced cost. The arrangements disclosed in the above mentioned copending application are applicable only when a small part of the winding is required to be shielded, whereas it is a more particular object of the present invention to provide arrangements which permit an extension of the shielding to a much larger part of the winding.

In accordance with illustrated embodiments, the shielding sctructures of the present invention comprise a plurality of shields or capacitance elements the first of which is conductively connected to the winding terminal, while the remainder of the shields are electrostatically coupled thereto in a series relation for receiving charging currents therefrom. Each shield has a first part arranged relatively close or, in other words, in relatively close electrostatic coupling with a corresponding successive portion, coil or coils, of the winding, the total shielded portion beginning at the terminal and comprising a predetermined fractional part of the winding. Each shield except the last has other parts or continuations extending away from the terminal and arranged progressively farther away and hence more loosely coupled with corresponding successive winding portions. These other shield parts are positioned outside partially overlapping parts of succeeding shields and are in relatively close electrostatic coupling therewith. The amount of overlapping of the respective shields decreases progressively from the first to the last as the total charging current to be transmitted to succeeding shields diminishes. The capacitances between the various shields and from the shields to the winding are so proportioned relative to the inherent capacitance network of the winding, in a manner fully described, as to produce a desired initial distribution of the impressed voltage such that the gradients occurring across the winding units are reduced to low values well within normal insulation levels.

Figure 2:
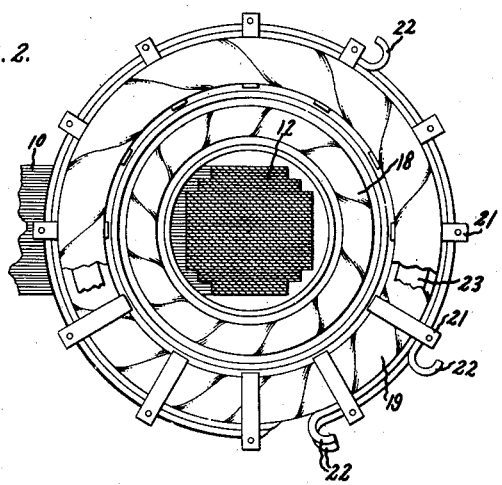

Further objects and advantages of the invention will appear from the following description taken in connection with the accompanying drawings in which Fig. 1 is a front elevation, partly in section, of a transformer constructed in accordance with the invention; Fig. 2 is a plan view of the winding; Fig. 3 is a conventional diagram illustrating the capacitance network of a winding; Fig. 4 is an explanatory group of voltage gradient curves; Figs. 5 to 18, inclusive, are explanatory diagrams illustrative of various shielding arrangements of which 6 to 12, inclusive, and 13 to 18 are in accordance with my invention.

The various shielding arrangements of this invention will be described as applied to a simple solenoidal winding although less complex than some windings, this type is in extensive use and it serves the purpose of illustration and lends itself readily to mathematical treatment.

The transformer shown in Fig. 1 includes a laminated magnetic core 10 having a pair of legs 11 and 12 surrounded by windings indicated at 13 and 14, respectively, the transformer being adapted to be enclosed in a suitable casing (not shown). Portions of the windings on the leg 12 are shown in section for more clearly illustrating the winding arrangement. A low voltage winding 18 is arranged around the leg while a high voltage winding 19 is in turn arranged around the low voltage winding. The high voltage winding 19, to which the shielding structure is applied, is in this instance formed of a plurality of series connected annular disk coils which are maintained in an axially spaced relation by U-shaped spacing strips 21 extending radially between the coils. This winding is provided with an improved shielding structure, which will prevent the occurrence of excessive initial voltage stresses between its turns, or coils.

The shielding structure includes a plurality of electrostatic shields comprising insulated conductive strips or ribs 22 disposed around the outer edges of the annular coils and connected in a manner hereinafter described in a number of modifications. An insulated annular electrostatic plate 23 may also be provided at the terminal end of the winding stack 19 and connected to the winding terminal. This electrostatic plate should, of course, be slit at one side to avoid short circuit currents within the plate itself. For similar reasons, the ribs of the shielding structure must not close around the winding leg. These ribs, in fact, will vary in length as indicated in Fig. 2 for reasons which will be pointed out.

The annular flat winding disks indicated at 19 are ordinarily called sections. These sections may be connected together in any suitable manner to form the winding. The way they are connected in series in the various sketches is commonly known in the art as a start to start and finish to finish connection. In order that they will function properly as a winding when so connected, two adjacent sections with a start to start connection must be wound from the inside out in reverse directions and when so wound and connected, they are ordinarily called a double section coil. The term "coil" as used hereafter in this specification will signify such a double section coil, whereas one of the sections of the coil will be referred to merely as a section. The finish to finish connections, which appear along the right-hand side of the coil stacks in the sketches, will be referred to as the connections between coils, or simply, coil connections.

Refer now to Fig. 3, which is a conventional diagrammatic sketch of the equivalent electrostatic and electromagnetic networks of a disk winding, such as shown in Fig. 1, having a number of winding coils uniformly distributed between its two terminals 25 and 26. Terminal 25 is ungrounded, while 26 may be grounded, as indicated, though this is not essential. A plurality of elements $C_c$ represent the capacitances across the coils and the elements $C_g$ represent the capacitances between individual coils and ground. Considering first the unshielded winding, if a voltage E is suddenly impressed upon the winding terminal 25, its distribution over the winding is illustrated by the curve 31 of Fig. 4, in which a steep voltage gradient occurs at the end of the winding as measured by the slope of the curve 31 at that point. After a period of time the voltage gradient will become uniform throughout the winding, as represented by the straight line curve 32. This phenomenon is more fully explained in my above mentioned patent, and which patent discloses various arrangements whereby the initial voltage gradient may be made to coincide with the final gradient curve 32.

This is accomplished in one typical arrangement by supplying additional capacitance to the winding elements in such a manner that the shunt capacitances to ground, $C_g$, are all substantially neutralized whereby the potential gradient produced by capacitance is the same as that produced by the inductance of the winding. A uniform voltage distribution is thus obtained throughout the winding under all conditions. While this method is wholly rational, the electrostatic shield constructions involved are considerably more expensive than those required by the present invention.

The capacitance elements, or ribs 22, of the present shielding structure are arranged over a portion only of the winding adjacent the line terminal at which the surge voltage E may appear, and in such a manner as to distribute only a part of the impressed voltage uniformly over this portion of the winding while the remainder of the voltage distributes with non-uniform but reduced gradients over an unshielded part of the winding. Referring again to Fig. 3, electrostatic shielding is applied to an $m$ number of winding coils extending from the line terminal 25, the effective shield capacitances being indicated at $C_1$, $C_2$, etc., these capacitances being connected to the line terminal for receiving their charging currents therefrom. The capacitances $C_1$, $C_2$, etc. are so proportioned relative to capacitances $C_g$ of the associated winding coils that a part of the surge voltage is distributed uniformly, that is, with equal voltage steps $e$, across an $m$ number of winding coils and at a gradient very materially less than what the gradient would be over these coils if unshielded as represented by curve 31 of Fig. 4. These capacitances are furthermore so proportioned that the remainder of the voltage distributes over other of the winding coils at gradients less than that over the $m$ coils and at progressively decreasing values. Thus the maximum voltage gradient which can occur across the winding is definitely fixed at the known value $e$ and the winding may accordingly be insulated with a maximum of efficiency.

Now, when a high voltage surge coming from the external circuit or line reaches the terminal 25, the static plate 23 and the conductive ribs of the shielding structure which are connected thereto are instantly charged to the full voltage of the surge, and the initial distribution of this voltage among the shield ribs and within the winding depends entirely upon the capacitance network, including capacitances from static plate and shield to respective portions of the winding to which they are closely coupled electrostatically, the series capacitances $C_c$ across the coils and the shunt capacitances $C_g$ from the coils to ground. The charging current must all emanate from the static plate and the terminal connected shield. The greater the capacitance of any unit of this network, as compared with the other units in series with it, the smaller will be the voltage across it and vice versa. Also, assuming a uniform dielectric, the larger the opposed conducting surfaces of a capacitance unit and the closer they are spaced, the larger will be the capacitance. Careful adjustment of the shield capacitances must be made in order to obtain the desired voltage gradient.

The electrostatic field, which fixes initial voltage distribution within the winding, may be considered in two components, one emanating from the static plate and traversing the winding in an axial direction, with uniform strength throughout the shielded portion, corresponding to equal voltages across the various coils, and the other emanating from the shielding structure, in a radial direction, to the winding and thence toward the grounded winding leg of the core. Charges for the radial capacitances from the coils to ground are supplied through the series radial capacitances between ribs of the shielding structure and the corresponding adjacent outside turns of the coils. Since two interconnected outside coil turns must be at the same voltage and the equal voltages across coils will be found between consecutive coil connections, the radial capacitances from coils to ground, and the radial capacitances from the ribs to coils also, will be calculated for the respective coil connections, that is, to the pairs of outside coil turns which are connected together.

For the voltage distribution here considered, in which the axial component of electrostatic flux throughout the shielded portion of the winding is uniform corresponding to the uniform voltage steps $e$ across coils, it is seen that this same axial component emanates from the last shielded section to the first unshielded section, thus giving the same voltage $e$ across a final coil of which only one section is shielded. It is thus seen that in order to obtain the equal voltage steps $e$ for an $m$ number of coils, it is only necessary to provide shielding ribs for an $m-1$ number of coil connections (interconnected outside turns).

Also, for the voltage distribution here considered, the axial component of electrostatic flux emanating from the shielded part of the winding must be just sufficient to charge the effective network capacitance to ground of the unshielded part to the voltage $E-me$, where $E$ is the total surge voltage at the winding terminal. This voltage $E-me$ will then be distributed throughout the unshielded part of the winding in accordance with the same law which applies for the total winding when no shields are used. The voltage across each coil, proceeding away from the shielded portion of the winding, will be smaller than that across the preceding coil.

When shielding is to be applied to only a part of the total winding, in accordance with the principles of the present invention, an arbitrary choice is possible either of the magnitude of the equal voltage steps $e$ or of their number $m$, but not of both. Having chosen one of these factors, the other may be calculated as follows:

The axial capacitance of the $m$ coils across which the voltage is $me$ is $C_c/m$, where $C_c$ is the effective axial capacitance of one coil. The network capacitance to ground of the remainder of the winding, with voltage $E-me$, may be expressed by the term $fyC_c$, in which $y$ is the ratio of $C_g$, the radial capacitance of one coil to ground, to $C_c$, or $$y = \frac{C_g}{C_c}, \text{ and } fy = y + \tfrac{1}{4}y^2 + \tfrac{1}{2}y.$$

Since these capacitances $C_c/m$ and $fyC_c$ are in series, the voltages across them are in inverse proportion thereto. Thus, $$\frac{m_e}{E-me} = \frac{f_y C_c}{C_c/m} = mfy \qquad (1)$$

whence $$e = \frac{fy}{1+mfy} E \qquad (2)$$

or $$m = \frac{E}{e} - \frac{1}{fy} \qquad (3)$$

Now suppose that the desired voltage gradient for the shielded winding part, or in other words, the voltage step $e$ across coils thereof had been arbitrarily selected, then the number of coils which must be shielded may be determined by Equation 3. In Fig. 3 it is assumed that $m$ was found to be five in which case the $m-1$ necessary shield capacitances are four, indicated by $C_1$ to $C_4$, inclusive. The value for these capacitances necessary to produce the voltage distribution which had been selected may be readily calculated and the gradient curve for the winding is illustrated in Fig. 4 at 33. Referring to this curve, it will be noted that it is a straight line for the first five coils having a slope less than half of the steepest part of curve 31 for the unshielded winding. After the first five coils the gradient curve continues tangentially from the end of the straight portion following the same law as curve 31 and starting from the corresponding value of voltage. Thus it will be seen that the gradient over the unshielded coils is no greater than for the shielded coils and furthermore, that the gradient decreases progressively toward the other end of the winding.

If $m$, the number of coils with equal voltage steps $e$ had been arbitrarily selected, instead of the value of $e$, the latter would, of course, be calculated by Equation 2.

Now assume, for example, that instead of following the above outlined procedure, it had been decided to shield only the first five coils but at a more reduced gradient, that is, with voltage steps $e$ across coils approximately half the value selected in the previous case. The gradient across these first five coils would then follow the first straight line portion of curve 35 but, after the fifth coil, the gradient curve, following curve 31 for the same voltage value, would drop off at a steep angle as indicated by the dotted curve portion 35'. The voltage across the sixth coil would therefore be almost as great as that across the first coil of an unshielded winding. If it is desired that the voltage step $e$ across the shielded coils be such as to give the gradient represented by the entire curve 35, it is necessary that the shielding be extended over a greater number of coils, twenty in this case, as calculated by Equation 3 in order that a gradient no higher than that over the shielded coils occurs across the coils at the end of the shielded portion of the winding.

Referring now to the schematic sketches of Figs. 5 to 18, inclusive, it will be explained how to calculate the shielding capacitance to be supplied to the winding in accordance with the foregoing principles. In Fig. 5, in which but a single terminal connected shield 41 of three ribs is provided, the capacitance of the first pair of ribs to the first coil connection which will be designated as $K_1$, and the capacitance of the single third rib to the second coil connection, designated as $K_2$, may be expressed by the following equations, keeping in mind that two capacitances in series with each other are in inverse proportion with their respective voltages and that $K_1$ and $K_2$ are each in series with a capacitance $C_g$:

$$K_1 = \frac{E-e}{e} C_g \qquad (4)$$

and $$K_2 = \frac{E-2e}{2e} C_g \qquad (5)$$

These capacitances may be obtained by adjusting either the length of the ribs or their spacings from the respective coils. If a uniform spacing is assumed for all ribs, sufficient to insulate for the maximum voltage to be assumed (2e for the various arrangements shown in Figs. 5 to 18), then all adjustments for the desired capacitance values would be made by varying the length of the respective ribs. In certain cases, however, as for the first pair of ribs in Fig 5, where the voltage is only e, it may be necessary to reduce the insulation and spacing in order to obtain the needed capacitance.

Fig. 5 has been included here for explanatory purposes only, since no claim is made herein to a single shield structure connected to the winding terminal. It is impractical to extend such a shield to cover more than a few coils on account of difficulties in insulating the ribs farther from the terminal for the high voltages appearing between them and the coils which they shield. It is therefore a further object of the present invention to provide various embodiments illustrative of the principles herein set forth in accordance with which the shielding in a simple form may be extended over a relatively large portion of the winding without presenting any serious insulation problems.

In the arrangement illustrated in Fig. 6 the shielding structure includes a first shield 42 for the first two coil connections and an additional shield 43 comprising a pair of ribs for the third coil connection, with no conductive connection to either the first shield or the winding. Arranged over one of the ribs of this pair and relatively closely coupled electrostatically therewith is an additional rib 42' constituting a part of the first shield. By properly proportioning the ratios of the capacitances between the rib 42' and the shield 43, and between the shield 43 and the third coil connection, the desired voltage 3e to be obtained between the first shield and the third coil connection is divided so that the voltage 2e occurs between rib 42' and shield 43 and the voltage e between shield 43 and the third coil connection. Designating the capacitance between the first and second shields and between the second shield and the third coil connection as $K_3$ and $K_4$, respectively, the values to which they are to be adjusted may be expressed as follows:

$$K_3 = \frac{E-3e}{2e} C_g \quad (6)$$

$$K_4 = \frac{E-3e}{e} C_g \quad (7)$$

In the arrangement illustrated in Fig. 7, the second shield 45 is provided with a third rib extending adjacent the fourth coil connection. In order that the second shield, enlarged by the addition of the third rib, may receive the requisite charging current from the first shield 44, the latter shield is in this instance also provided with an additional rib connected in the group 44' arranged over the second shield 45. The additional capacitances between the first and second shields and between the second shield and the fourth coil connection, designated as $K_5$ and $K_6$, respectively, are both adjusted to the same value, $$K_5 = K_6 = \frac{E-4e}{2e} C_g \quad (8)$$

so that a voltage 2e occurs between the two shields, a voltage e between the second shield 45 and the third coil connection, and a voltage 2e between the second shield and the fourth coil connection. It will here be noted that this shielding arrangement is the equivalent of that shown in the sketch of Fig. 3 in that equal voltage steps e are effectuated across an $m=5$ number of coils and hence the voltage gradient for this arrangement will correspond to curve 33 of Fig. 4.

Continuing with the same general method, as illustrated in Fig. 8, the first shield 46 is provided with a third additional rib in the group 46' arranged over the second shield 47 and with a voltage 2e therebetween, while an additional rib 47' of the second shield is arranged over a third shield 48 comprising a pair of ribs arranged adjacent the fifth coil connection. As in the previously described modifications, the various capacitances are so adjusted that the voltage e occurs between the third shield 48 and the fifth coil connection so as to extend the uniform voltage gradient over an additional coil. Thus it will be noted that with each rib added to the first shield with voltage 2e between it and the next succeeding shield, the shielding structure may be extended farther down the stack to an additional coil.

In order to extend the shield structure farther than is shown in Fig. 8, by the same general method, it will be necessary to add ribs to the first shield in a third layer, that is, they must be arranged over ribs of the second shield. It is generally desirable to maintain the overall diameter of the winding structure including the shields to a minimum, and in Figs. 9 and 10 are illustrated arrangements whereby the shielding may be extended considerably further down the coil stack without increasing the number of layers of shielding ribs beyond two. Referring to Fig. 9, the first shield 49 including the portion 49' in the second layer is similar to the shield 46—46' of Fig. 8, while the second shield 51 includes one rib 51'' which is arranged outside of the third rib of the first shield 49. This is equally as effective in increasing the capacitance between the first and second shields as would be an additional rib at the lower end of the former overlapping a corresponding lower rib of the latter. An additional rib may then be added to the lower end of the second shield in the group 51' so as to increase the capacitance between the latter and the third shield 52, which may also now be supplied with an additional rib extending to the sixth coil connection. This scheme is further developed in the arrangement illustrated in Fig. 10 in which the second shield 54 is provided with two ribs in the group 54'' arranged over the second and third ribs of the first shield 53. Again the shielding is extended through shields 55 and 56 farther down the winding stack than in the preceding case by an additional coil.

Should it be desired to extend the shield structure still farther down the stack than is shown in Fig. 10, it will be necessary to add ribs to the second shield in a third layer. Then the arrangements illustrated in Figs. 11 and 12 might be advantageously employed. In Fig. 11 it will be noted that the first shield 57 includes a second group of ribs 57' in the second layer and a third group of ribs 57'' in a third layer. The second shield 58, commencing underneath the second group of ribs of the first shield, also extends into the third layer, beyond the lower end of the first shield while, by the addition of further ribs to the third and fourth shields 59 and 60, the total shielding is extended one coil farther down the stack than in the arrangement shown in Fig. 10. In Fig. 12 the second shield 62 is provided with a group of ribs 62' arranged over the second and third ribs of the first shield 61 in the manner described in connection with the arrangement illustrated in Fig. 10. Thus, without increasing the number of rib layers beyond three, the shielding may be extended down the winding stack over a total number of ten coil connections, giving $m-1=10$ or $m=11$.

In Figs. 10 and 12 are reached the limits of the extent of the shielding which may be obtained with two layers of ribs, and with three layers, respectively, with none of the shields except the first connected to the winding, and with voltages between adjacent shields and between any rib and the adjacent coil not exceeding $2e$. The shielding may be extended indefinitely, of course, by increasing the number of layers of ribs.

We will now consider a second classification of shielding arrangements wherein all of the various shields are connected to the winding at different points. Referring again to the arrangement of Fig. 6, it will be observed that the second shield 43 is at the same voltage, or substantially so, as the connection between the second and third coils. The voltage distribution therefore would not be affected by making a conductive connection between this coil connection and shield 43, thus placing the capacitances of the third and fourth ribs of the first shield in parallel. The fourth rib 42' may then be removed from its position in the second layer facing the second shield 43 and placed beside the third rib in the first layer without affecting the result. Such arrangement of shields is shown at 64 and 65 in Fig. 13 in which, without exceeding the voltage $2e$ between the shield ribs and coils, it is possible, with a single layer of ribs, to shield one more coil than according to the arrangement of Fig. 5. No claim is made herein to the shielding arrangement illustrated in Fig. 13, since it forms part of the subject matter disclosed and claimed in the above mentioned copending application. It is included here primarily for the purpose of illustrating how by interconnecting the various shields following the first of the various modifications of Figs. 6 to 12, inclusive, with equal voltage points of the winding stack, certain advantages may accrue.

In Figs. 14 to 17, inclusive, the shield structure having interconnections with the winding is further developed in accordance with the present invention. In Fig. 14 four shields 66 to 69, inclusive, are provided, the first being connected to the terminal while each succeeding shield is connected to the coil connection having a voltage greater by one step $e$ than the first coil connection under such succeeding shield. In Fig. 15, by increasing the capacitance between the first shield 70 and the second shield 71 with additional ribs 71' connected to the second shield and arranged over the third and fourth ribs of the first shield, the number of shields may be increased to five, 70 to 74, inclusive. Thus without increasing the number of rib layers beyond two, the number of protected coils is increased in Figs. 14 and 15 by two over the corresponding arrangements of Figs. 8 and 10 in the first classification.

In Figs. 16 and 17 the shielding structure is expanded into three layers of ribs. In Fig. 16 the ribs are arranged in six shields, 75 to 80, inclusive, and in Fig. 17 in seven shields, 81 to 87, inclusive, shielding 12 and 14 coils respectively, which are three more coils than are shielded by the corresponding arrangements of Figs. 11 and 12 of the first classification.

Besides making it possible to extend the shielding structure over a larger number of coils with a given number of rib layers, the second classification has an added advantage over the first in that discrepancies in rib capacitances are not so likely to have cumulative effects upon the voltage distribution. Thus, it is conceivable, in Figs. 11 or 12 for instance, that voltages considerably greater than $2e$ might occur between adjacent ribs, or from ribs to coils, at points remote from the terminal. The connection of the various shields to the winding tends to compensate such discrepancies. However, the construction is simpler without these connections, and arrangements of the first classification may, in some cases, be preferred.

It is generally desirable that the ribs of the various shields have an overall width in the axial direction no greater than the thickness of the respective coils, because of the necessity of maintaining sufficient space between the adjacent coils for the through circulation of cooling oil. It is obvious that if the ribs were of a greater width than the thickness of the coils, the oil circulation, in general, would be materially reduced, or else a wider spacing of the coils on the winding leg would be required. In some instances, however, it may be possible to utilize shielding ribs having a width greater than the thickness of a single coil. In Fig. 18 is illustrated a modification of the shielding structure in which the various ribs of the shields 91 to 96, inclusive, are of a double width, each rib corresponding to a pair of ribs plus the intervening space in the arrangement shown in Fig. 16. This modification of the ribs is equally applicable to arrangements shown in several of the other figures.

It has been seen that, with shielding structures in accordance with the present invention, the shielding may be extended to a considerable part of the winding with only small voltages ($2e$ for the arrangements shown) between adjacent ribs or between ribs and coils. In this connection, it should be observed that for a given surge voltage, $E$, the coil voltage $e$ becomes smaller as the shielding structure is extended to more coils. This is seen in the Formula 2 for calculating $e$, where $m$ is the number of equal coil voltage steps. It may also be said that the ribs of the shielding structure are particularly adapted to efficient forms of insulation, and that the form of assembly around the edges of the coils, permitting the maintenance of open ducts between them, is particularly favorable to cooling. Moreover, the construction is convenient and economical. Another very great advantage over previous methods of shielding is that the shield which is connected to the terminal, carrying the full voltage $E$, extends only about one-half as far along the winding for a given amount of shielding. Thus, the total voltage between the extremity of the shield and the point in the winding opposite it is only about one-half as great. In this respect the arrangements of Figs. 10, 12, 15 and 17 are particularly favorable.

It remains to be specifically pointed out that, with this method of shielding, with the shielding structure and uniform initial gradient extending over only a fraction of the winding, it makes no appreciable difference in the gradient whether the other end of the winding is grounded or connected to another leg of the line. Shielding arrangements in accordance with this invention may therefore be used at both ends of a winding for line to line connected apparatus, such as transformers. If surge voltages $E_1$ and $E_2$ are simultaneously impressed at the opposite ends of such a winding, the resultant initial voltage distribution will be that found by superposing the gradients due to $E_1$ and $E_2$ acting separately.

It is to be understood of course that while I have shown and described the invention as it may be carried out by means of capacitance elements in the form of ribs, this is but a preferred form. It is obvious that these capacitances may readily be provided in other forms to produce the shielding capacitance network as described.

The invention has been explained by illustrating and describing various specific forms of electrostatic shielding structure, but it will be apparent that arrangements other than those specifically shown may be used without departing from the spirit of the invention and the scope of the appended claims.

What I claim as new and desire to secure by Letters Patent of the United States, is:

1. In combination with a winding of electrical induction apparatus, means for distributing over said winding a voltage suddenly impressed upon a terminal thereof, said means comprising a network of capacitances associated with a first part of said winding nearest the terminal thereof, said capacitances being so arranged and so proportioned relative to the inherent capacitances between winding turns and ground that said voltage is distributed with a uniform reduced gradient over said first winding part and with progressively decreasing gradient over the remainder of said winding.

2. In combination with a winding of electrical induction apparatus, capacitance means associated with said winding for distributing over said winding a voltage suddenly impressed upon a terminal thereof, a conductive connection between said capacitance means and said terminal, said capacitance means being so arranged and so proportioned as to distribute a part of a suddenly impressed voltage over a predetermined portion of said winding nearest said terminal with a predetermined substantially uniform gradient and the balance of the voltage over the remainder of the winding at a gradient less than said uniform gradient.

3. In combination with a winding of electrical induction apparatus, means for distributing over said winding a voltage suddenly impressed upon a terminal thereof, said means comprising a plurality of capacitance elements associated with a first part of said winding extending from said terminal, the first of said elements being connected to said terminal, each of said elements in succession having a portion in relatively close electrostatic coupling with a corresponding successive portion of said winding part, the capacitances between each of said elements and the immediately preceding and immediately succeeding elements, and to the corresponding winding portion, being such that the capacitance to ground of said winding portion will be charged to a voltage corresponding to a gradient giving approximately equal voltage steps across equal portions of said first part of said winding while the axial component of electrostatic flux emanating from said first winding part is just sufficient to charge the network capacitance to ground of the remainder of said winding to the voltage at the end of said first winding part.

4. In combination with a winding of electrical induction apparatus having distributed capacitance to ground, means for distributing over said winding a voltage suddenly impressed upon the winding terminal comprising an electrostatic shielding structure associated with a first part of said winding consisting of a plurality of similar coils adjacent said terminal, the capacitance between the said terminal and said first part of the winding provided by said shielding structure being such that the resulting voltage gradient gives voltage steps across coils which are substantially equal throughout said first part of the winding and which decrease progressively throughout the remainder of the winding.

5. In combination with a winding of electrical induction apparatus, means for distributing over said winding a voltage suddenly impressed upon a terminal thereof, said means comprising a plurality of capacitance elements, the first of said elements being connected to said terminal and said elements having portions in relatively close electrostatic coupling with corresponding successive similar portions of said winding comprising a predetermined fractional part thereof extending from the terminal end, the capacitances between said elements and from said element portions to the corresponding winding portions being such that a part of said voltage is distributed over said winding portions in substantially equal voltage steps of such value that the axial component of electrostatic flux emanating from the last of said winding portions is just sufficient to charge the network capacitance to ground of the remainder of said winding to the voltage at the end of said winding part, giving progressively decreasing voltage steps across successive similar portions of said remainder.

6. In combination with a winding of electrical induction apparatus, means for distributing over said winding a voltage suddenly impressed upon a terminal thereof, said means comprising a plurality of capacitance elements electrostatically coupled in a series relation, the first of said elements being conductively connected to said terminal, each of said elements in succession having a part in relatively close electrostatic coupling with a corresponding successive similar portion of said winding extending from said terminal, the capacitances between consecutive elements and from each of said elements to the corresponding winding portion being such that a part of said voltage is distributed in substantially equal steps across said winding portions, said elements being so arranged that the voltage between winding portions and corresponding adjacent capacitance elements is limited to double the value of said equal voltage steps.

7. In combination with a winding of electrical induction apparatus, means for distributing over said winding a voltage suddenly impressed upon a terminal thereof, said means comprising a plurality of capacitance elements associated with a part of said winding, the first of said capacitance elements being conductively connected with said winding terminal and said capacitance elements being electrostatically coupled together and with corresponding successive similar winding portions of said part so that substantially equal voltages appear across said winding portions and voltages no greater than double said equal voltages occur between any of said winding portions and the adjacent capacitance element.

8. In combination with a winding of electrical induction apparatus, means for distributing over said winding a voltage suddenly impressed upon a terminal thereof, said means comprising a plurality of series electrostatically coupled capacitance elements, said elements being electrostatically coupled with corresponding series connected substantially similar portions of said winding, the capacitances between consecutive elements and between each of said elements and the corresponding portion of said winding being such that substantially equal voltages appear across each of said winding portions.

9. In combination with a winding of electrical induction apparatus, means for distributing over said winding a voltage suddenly impressed upon a terminal thereof, said means comprising a plurality of series electrostatically coupled capacitance elements, the first of said elements being conductively connected to said terminal, said elements each having a portion in relatively close electrostatic coupling with corresponding successive portions of said winding, said winding portions being substantially similar and commencing at said terminal, the capacitance between said portions of said capacitance elements and said winding portions being such that substantially equal voltages appear across each of said winding portions.

10. In combination with a winding of electrical induction apparatus, means for distributing over said winding a voltage suddenly impressed upon a terminal thereof, said means comprising a plurality of capacitance elements electrostatically coupled in a series relation, said elements being also electrostatically coupled with corresponding successive portions of said winding extending from the terminal end thereof, said portions comprising only a fractional part of said winding, the capacitance between said elements and the corresponding portions of said winding being such that a part of the suddenly impressed voltage is substantially uniformly distributed over said winding part.

11. A winding having a terminal and comprising a stack of coils arranged around a grounded core, means for substantially neutralizing the capacitances between respective coils and said core so as to effect a distribution of a high voltage transient suddenly impressed upon said terminal over a plurality of coils adjacent said terminal, said means comprising a plurality of series capacitance coupled electrostatic shields arranged around the outer circumference of said coils, the first of said shields comprising a relatively large capacitance element and connected to said terminal, the succeeding shields comprising elements of progressively decreasing capacitance, each successive shield following the first having a first portion arranged between the end portions of the preceding shield and said winding and a second portion extending beyond the end of the preceding shield whereby capacitance charging currents are transmitted from each shield to the next succeeding shields to establish voltages on said succeeding shields of progressively decreasing values.

12. A winding having a terminal and comprising a plurality of coils arranged around a grounded core, means for substantially neutralizing the capacitance between said coils and said core so as to effect a desired distribution of a high voltage transient suddenly impressed at said terminal over a number of said coils adjacent said terminal, said means comprising a plurality of series capacitance coupled electrostatic shields arranged around the outer circumference of said coil sections, the first of said shields being connected to said terminal and arranged around a predetermined number of said coils immediately adjacent said terminal, the succeeding shields each being arranged so that the end thereof nearest the high voltage terminal extends under the preceding shield and the opposite end of each extends around a coil beyond the end of the immediately preceding shield.

13. In combination with a winding of electrical induction apparatus, means for distributing over said winding a voltage suddenly impressed upon a terminal thereof, said means comprising a plurality of capacitance elements, the first of said elements being connected to said terminal and having a first portion in relatively close electrostatic coupling with a first portion of said winding adjacent said terminal and a second portion relatively closely coupled electrostatically with the next succeeding element, each element succeeding said first element having a portion relatively closely coupled electrostatically with corresponding succeeding portions of said winding and each of said succeeding elements except the last of said plurality of elements having a portion relatively closely coupled electrostatically with the next succeeding element.

14. In combination with the winding of electrical induction apparatus having distributed shunt capacitance between turns and ground, means for distributing over said winding a voltage suddenly impressed upon a terminal thereof, said means comprising a plurality of electrostatic shields arranged around the outer periphery of said winding, the first of said shields being connected to said terminal and having a first part arranged in close electrostatic coupling with the portion of said winding nearest said terminal, the first part of each successive shield being arranged in relatively close electrostatic coupling with corresponding different successive portions of said winding, the remainder of each of said shields except the last being relatively closely coupled electrostatically with the next succeeding shield and progressively more loosely coupled electrostatically with adjacent winding portions.

15. In combination with a winding of electrical induction apparatus having distributed shunt capacitance to ground, means for distributing over said winding a voltage suddenly impressed upon a terminal thereof, said means comprising a plurality of electrostatic shields disposed around the outer surface of said winding in an effective overlapping relation, the first of said shields being connected to said terminal, the succeeding shields each starting at a point underneath the preceding shield intermediate its ends and terminating at a point beyond the corresponding end of the preceding shield, the first part of each of said shields being arranged in relatively close electrostatic coupling with the adjacent winding portion and the remaining parts of each of said shields being arranged in progressively looser electrostatic coupling with adjacent winding portions.

16. In combination with a winding of electrical induction apparatus, shielding means for distributing over said winding a voltage suddenly impressed upon a terminal thereof, said shielding means comprising a plurality of capacitance elements electrostatically coupled in a series relation and arranged adjacent the outer surface of said winding, means conductively connecting the first of said elements to said terminal said first element having relatively high capacitance with a portion of said winding nearest said terminal and progressively decreasing capacitance with succeeding portions of said winding and means including portions of succeeding capacitance elements arranged between said first element and said succeeding winding portions for distributing the voltage stress therebetween and for supplying charging currents to said succeeding capacitance elements.

17. In combination with the winding of electrical induction apparatus including a plurality of coils connected in series to a line terminal, means for distributing over said coils a voltage suddenly impressed upon said terminal, said means comprising a plurality of electrostatic shields arranged around said coils in an effective overlapping relation relative to each other, the first of said shields being connected to said terminal and having a portion in close electrostatic coupling with a first group of coils nearest said terminal, other portions of said first shield being progressively more loosely coupled with successive coil groups and relatively closely coupled with portions of the next succeeding shield.

JAMES M. WEED.